United States Patent
Unagami et al.

(10) Patent No.: US 12,086,283 B2
(45) Date of Patent: Sep. 10, 2024

(54) CONTROL METHOD, SERVER, RECORDING MEDIUM, AND DATA STRUCTURE

(71) Applicant: Panasonic Intellectual Property Corporation of America, Torrance, CA (US)

(72) Inventors: Yuji Unagami, Osaka (JP); Junji Michiyama, Fukuoka (JP); Junichiro Soeda, Nara (JP); Yuuki Hirose, Osaka (JP); Tetsuji Fuchikami, Osaka (JP); Motoji Ohmori, Osaka (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 367 days.

(21) Appl. No.: 17/162,464

(22) Filed: Jan. 29, 2021

(65) Prior Publication Data

US 2021/0150058 A1    May 20, 2021

Related U.S. Application Data

(63) Continuation of application No. PCT/JP2019/048391, filed on Dec. 11, 2019.
(Continued)

(51) Int. Cl.
*G06F 21/62* (2013.01)
*H04L 9/08* (2006.01)

(52) U.S. Cl.
CPC .......... *G06F 21/6245* (2013.01); *H04L 9/083* (2013.01)

(58) Field of Classification Search
CPC .............................. G06F 21/6245; H04L 9/083
See application file for complete search history.

(56) References Cited

U.S. PATENT DOCUMENTS

2018/0082024 A1   3/2018   Curbera et al.
2018/0293556 A1*  10/2018  Hyun ................. G06Q 20/3678
(Continued)

FOREIGN PATENT DOCUMENTS

JP    2016-91067     5/2016
WO    2018/124297    7/2018

OTHER PUBLICATIONS

"The Authoritative Dictionary of IEEE Standards Terms, Seventh Edition," in IEEE Std 100-2000, vol. no., pp. 1-1362, Dec. 11, 2000, doi: 10.1109/IEEESTD.2000.322230. (Year: 2000).*
(Continued)

*Primary Examiner* — Benjamin E Lanier
*Assistant Examiner* — Felicia Farrow
(74) *Attorney, Agent, or Firm* — Wenderoth, Lind & Ponack, L.L.P.

(57) ABSTRACT

A control method that, in an information management system including a plurality of servers each having a distributed ledger, is executed by a server from among the plurality of servers, includes: receiving first transaction data that includes identification information and permission or non-permission information, the identification information being associated with user information that is managed in the information management system and relates to a first user, the permission or non-permission information indicating whether provision of the user information to a second user is permitted; and storing the first transaction data received, in the distributed ledger in each of the plurality of servers.

12 Claims, 18 Drawing Sheets

Related U.S. Application Data

(60) Provisional application No. 62/777,922, filed on Dec. 11, 2018.

(56) References Cited

U.S. PATENT DOCUMENTS

| | | | |
|---|---|---|---|
| 2018/0293577 A1* | 10/2018 | Kim | G06Q 20/36 |
| 2019/0205932 A1* | 7/2019 | Ericson | G06Q 20/0658 |
| 2019/0334703 A1* | 10/2019 | Keskar | G06F 21/6218 |
| 2020/0019963 A1 | 1/2020 | Nakamura | |
| 2020/0356697 A1* | 11/2020 | Brannon | G06Q 50/18 |

OTHER PUBLICATIONS

Extended European Search Report issued Dec. 7, 2021 in corresponding European Patent Application No. 19896604.6.

International Search Report (ISR) issued on Feb. 25, 2020 in International (PCT) Application No. PCT/JP2019/048391.

National Strategy Office of IT, Cabinet Secretariat, "Interim Report by Working Group for Data Utilization in AI/IoT Era", [online], [search on Nov. 25, 2019], Mar. 2017, Internet <URL:https://www.kantei.go.jp/jp/singi/it2/senmon_bunka/data_ryutsuseibi/dai2/siryou1.pdf>, with English translation.

Shinsaku Kiyomoto, "Distributed Blockchain Architecture and Its Application to Data Distribution Platform", The 38th Joint Conference on Medical Informatics (JCMI), Nov. 2018, with English translation.

Mano Hiroshi et al., "Open data exchange market platform design", Journal of Information Processing and Management, vol. 60, No. 6, p. 391-401., Sep. 2017, with English translation.

* cited by examiner

| Transaction ID | Information address | Use condition | Generation date and time | Signature |
|---|---|---|---|---|
| a001 | add1 | Address and name are usable | 2018.10.10 15:00:00 | 89ag... |

FIG. 4

| Transaction ID | User ID | Information address | Use details | Generation date and time | Signature |
|---|---|---|---|---|---|
| b001 | u002 | add1 | Address and name | 2018.11.11 16:00:00 | 78ba.... |

FIG. 5

| Transaction ID | User ID | Information address | Provision details | Generation date and time | Signature |
|---|---|---|---|---|---|
| c001 | u002 | add1 | Address and name | 2018.11.11 17:00:00 | 5ab3... |

FIG. 6

| Transaction ID | User ID | Information address | Restriction details | Generation date and time | Signature |
|---|---|---|---|---|---|
| d001 | u002 | add1 | Address and name | 2019.5.11 17:00:00 | da12... |

FIG. 7

| Transaction ID | Information address | Deletion information | Generation date and time | Signature |
|---|---|---|---|---|
| e001 | add1 | Deletion | 2019.5.11 17:00:00 | c492... |

FIG. 8

| Transaction ID | Source address | Destination address | Generation date and time | Signature |
|---|---|---|---|---|
| f001 | add5 | add6 | 2018.10.10 15:00:00 | 3b44... |

CONTROL METHOD, SERVER, RECORDING MEDIUM, AND DATA STRUCTURE

CROSS REFERENCE TO RELATED APPLICATIONS

This is a continuation application of PCT International Application No. PCT/JP2019/048391 filed on Dec. 11, 2019, designating the United States of America, which is based on and claims priority of U.S. Provisional Patent Application No. 62/777,922 filed on Dec. 11, 2018. The entire disclosures of the above-identified applications, including the specifications, drawings and claims are incorporated herein by reference in their entirety.

FIELD

The present disclosure relates to a control method, a server, a recording medium, and a data structure.

BACKGROUND

Information banks (also referred to as "personal data trust banks") in which personal data is not only managed but also provided to third parties are used (see Non Patent Literature (NPL) 1).

CITATION LIST

Non Patent Literature

NPL 1: National Strategy Office of IT, Cabinet Secretariat, "Interim Report by WG for Data Utilization in AI/IoT Era", [online], [search on Nov. 25, 2019], Internet <URL: https://www.kantei.go.jp/jp/singi/it2/senmon_bunka/data_r yutsuseibi/dai2/siryou1.pdf>

SUMMARY

Technical Problem

However, there is a problem that, before each use of personal data, communication for information exchange for consent to use can take place between the individual and the Information bank.

In view of this, the present disclosure provides a control method, etc. that suppress communication that can take place before use of personal data in an information management system.

Solution to Problem

A control method according to an aspect of the present disclosure is a control method that, in an information management system including a plurality of servers each having a distributed ledger, is executed by a server from among the plurality of servers, the control method including: receiving first transaction data that includes identification information and permission or non-permission information, the identification information being associated with user information that is managed in the information management system and relates to a first user, the permission or non-permission information indicating whether provision of the user information to a second user is permitted; and storing the first transaction data received, in the distributed ledger in each of the plurality of servers.

These general and specific aspects may be implemented using a system, a device, an integrated circuit, a computer program, or a computer-readable recording medium such as CD-ROM, or any combination of systems, devices, integrated circuits, computer programs, and recording media.

Advantageous Effects

The control method according to an aspect of the present disclosure can suppress communication that can take place before use of personal data in an information management system.

BRIEF DESCRIPTION OF DRAWINGS

These and other advantages and features will become apparent from the following description thereof taken in conjunction with the accompanying Drawings, by way of non-limiting examples of embodiments disclosed herein.

FIG. 4 is an explanatory diagram schematically illustrating a data structure of use request transaction data in the embodiment.

FIG. 5 is an explanatory diagram schematically illustrating a data structure of provision transaction data in the embodiment.

FIG. 6 is an explanatory diagram schematically illustrating a data structure of use restriction transaction data in the embodiment.

FIG. 7 is an explanatory diagram schematically illustrating a data structure of deletion transaction data in the embodiment.

FIG. 8 is an explanatory diagram schematically illustrating a data structure of token grant transaction data in the embodiment.

Figure 1:
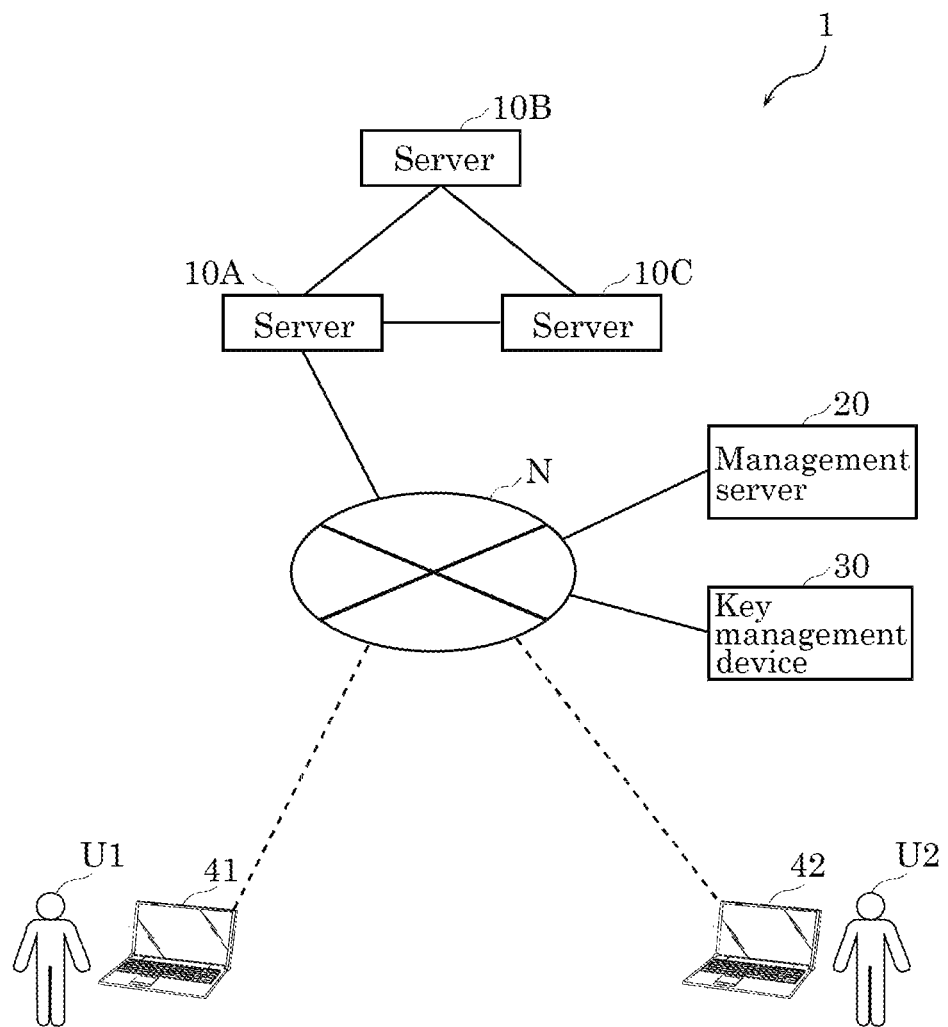
FIG. 1 is a block diagram schematically illustrating a structure of an information management system in an embodiment.

DESCRIPTION OF EMBODIMENTS (Underlying Knowledge Forming Basis of the Present Disclosure)

The present inventor has found the following problem with the information bank-related technology described in the Background Art section.

An information bank has a function of managing personal data and providing the data to third parties. The information bank is a service that makes contracts about utilization of personal data with individuals, and manages the personal data and also provides the data to third parties.

Before each use of personal data of an individual managed in the information bank, communication for information exchange for consent to use can take place between the individual and the information bank. Hence, an increase in the amount of data managed in the information bank is likely to cause an increase in communication traffic.

In view of this, the present disclosure provides a control method, etc. that suppress communication that can take place before use of personal data in an information management system.

To solve the stated problem, a control method according to an aspect of the present disclosure is a control method that, in an information management system including a plurality of servers each having a distributed ledger, is executed by a server from among the plurality of servers, the control method including: receiving first transaction data that includes identification information and permission or non-permission information, the identification information being associated with user information that is managed in the Information management system and relates to a first user, the permission or non-permission information indicating whether provision of the user information to a second user is permitted; and storing the first transaction data received, in the distributed ledger in each of the plurality of servers.

According to this aspect, the server stores, in the distributed ledger, the first transaction data including the permission or non-permission information relating to the use of the user information managed in the information management system. This eliminates the need for the server to perform information exchange for consent to use before each use of personal data. Thus, communication for the information exchange can be suppressed.

Moreover, since tampering with the transaction data stored in the distributed ledger is substantially impossible, the permission or non-permission information relating to the use of the user information managed in the information management system is appropriately managed. If, in information exchange for consent to use, there is a contradiction between the individual and the information bank or between a company that uses the personal data and the information bank, the personal data may not be used appropriately. With the control method according to an aspect of the present disclosure, the permission or non-permission information is stored in the distributed ledger and tampering is substantially impossible, so that such a contradiction can be prevented.

For example, the control method further includes: receiving, from a terminal of the second user, second transaction data that includes the identification information or attribute information indicating an attribute of the first user, and indicates a request to use the user information that conforms to the identification information or the attribute information; and storing the second transaction data received, in the distributed ledger in each of the plurality of servers.

According to this aspect, the server stores, in the distributed ledger, the second transaction data Indicating a request to use the user information managed in the information management system. Therefore, the information indicating the fact that the use is requested is appropriately managed without being substantially tampered with. The server can thus suppress communication that can take place before use of personal data, while appropriately managing the information indicating the fact that the use of the user information is requested.

For example, the user Information comprises one or more items of user information, the permission or non-permission information includes a condition for an item of user information permitted to be provided to the second user from among the one or more items of user information, the second transaction data further includes request information indicating an item of user information that relates to the first user associated with the identification information or the first user having the attribute indicated by the attribute information and that is requested by the second user to be provided, and the control method further includes: determining whether the request information included in the second transaction data conforms to the condition included in the permission or non-permission information; and storing, in the distributed ledger in each of the plurality of servers, the second transaction data received, when the request information is determined to conform to the condition.

According to this aspect, the server determines, for the user information which the second user requests to use, whether to permit the use based on the condition included in the permission or non-permission information. Since the permission or non-permission information is generated based on the first user's determination and stored in the distributed ledger, the permission or non-permission information is appropriately managed without being substantially tampered with. The server can thus suppress communication that can take place before use of personal data, when allowing the second user to use the user information according to the first user's determination.

For example, the control method further includes: receiving, when the user information is transmitted to the terminal of the second user based on the receiving of the second transaction data, third transaction data including the identification information or the attribute information related to the user information transmitted; and storing the third transaction data received, in the distributed ledger in each of the plurality of servers.

According to this aspect, the server stores, in the distributed ledger, the third transaction data indicating that the user information is transmitted to the second user. Therefore, the information indicating the fact that the user information is transmitted to the second user is appropriately managed without being substantially tampered with. The server can thus suppress communication that can take place before use of personal data, while appropriately managing the information indicating the fact that the user information is transmitted to the second user. There is also an advantage that the first user can know which company has used the user information of the first user in what way.

For example, the control method further includes: receiving, when a predetermined time elapses from transmission of the item of user information to the terminal of the second user, fourth transaction data including restriction information indicating that use of the item of user information provided is restricted; and storing the fourth transaction data received, in the distributed ledger in each of the plurality of servers.

According to this aspect, the server stores, in the distributed ledger, the fourth transaction data indicating that the use of the provided user information is restricted as a result of the predetermined time elapsing from the provision of the user information to the second user. Therefore, the information indicating the fact that the use is restricted is appropriately managed without being substantially tampered with. The server can thus suppress communication that can take place before use of personal data, while appropriately managing the information indicating the fact that the use of the user information is restricted.

For example, the control method further includes: receiving fifth transaction data including an identifier and deletion information, the identifier Indicating user information managed and deleted in the information management system, the deletion information indicating that the user information is deleted; and storing the fifth transaction data received, in the distributed ledger in each of the plurality of servers.

According to this aspect, the server stores, in the distributed ledger, the fifth transaction data indicating that the user information is deleted. Therefore, the information indicating the fact that the user information is deleted is appropriately managed without being substantially tampered with. The server can thus suppress communication that can take place before use of personal data, while appropriately managing the information indicating the fact that the user information is deleted.

For example, the control method further includes: obtaining, when the first transaction data is received, sixth transaction data including provision information for granting a token to the first user; and storing the sixth transaction data obtained, in the distributed ledger in each of the plurality of servers.

According to this aspect, the server grants the token to the first user in the case where the permission or non-permission information for the provision of the user information of the first user is stored in the distributed ledger. The token is value information managed by the distributed ledger, and can be used, for example, as a substitute for monetary value. This has an effect of facilitating the management of the user information in the information management system and promoting the utilization of the user information managed.

For example, the permission or non-permission information includes information indicating: a period during which the provision of the user information is permitted; a user for which the provision of the user information is permitted; or whether re-provision of the user information is permitted.

According to this aspect, the server appropriately manages the information indicating the period during which the provision of the user information is permitted, the user for which the provision of the user information is permitted, or whether the re-provision of the user information is permitted, without substantial tampering. This eliminates the need for the server to perform the foregoing information exchange for consent to use before each use of personal data. Thus, communication for the information exchange can be suppressed.

For example, the one or more items of user information are each linked with type information indicating a type of the item of user information, and the permission or non-permission information includes type information of an item of user information permitted to be provided.

According to this aspect, the server appropriately manages the type information of the user information permitted to be provided, without substantial tampering. This eliminates the need for the server to perform the foregoing information exchange for consent to use before each use of personal data. Thus, communication for the information exchange can be suppressed.

A server according to an aspect of the present disclosure is a server from among a plurality of servers that are included in an information management system and each have a distributed ledger, the server including: a processor that receives first transaction data that includes identification information and permission or non-permission information, the identification information being associated with user information that is managed in the information management system and relates to a first user, the permission or non-permission information indicating whether provision of the user information to a second user is permitted, and stores the first transaction data received, in the distributed ledger in each of the plurality of servers.

According to this aspect, the same effects as the control method described above can be achieved.

A recording medium according to an aspect of the present disclosure is a non-transitory computer-readable recording medium having a program for causing a computer to execute the control method described above.

According to this aspect, the same effects as the control method described above can be achieved.

A data structure according to an aspect of the present disclosure is a data structure that, in an information management system Including a plurality of servers each having a distributed ledger, is recorded in the distributed ledger, the data structure including: first transaction data that includes identification information and permission or non-permission Information, the identification information being associated with user information that is managed in the information management system and relates to a first user, the permission or non-permission information indicating whether provision of the user information to a second user is permitted, wherein the first transaction data is recorded in the distributed ledger in each of the plurality of servers.

These general and specific aspects may be implemented using a system, a device, an integrated circuit, a computer program, or a computer-readable recording medium such as CD-ROM, or any combination of systems, devices, integrated circuits, computer programs, and recording media.

An embodiment will be described in detail below, with reference to the drawings.

The embodiment described below shows a general and specific example. The numerical values, shapes, materials, structural elements, the arrangement and connection of the structural elements, steps, the order of steps, etc. shown in the following embodiments are mere examples, and do not limit the scope of the present disclosure. Of the structural elements in the embodiments described below, the structural elements not recited in any one of the independent claims representing the broadest concepts are described as optional structural elements.

Embodiment

This embodiment describes a control method, etc. that suppress communication that can take place before use of personal data in an information management system.

FIG. 1 is a block diagram schematically illustrating a structure of information management system 1 in this embodiment.

As illustrated in FIG. 1, information management system 1 includes servers 10A, 10B, and 10C, management server 20, and key management device 30. The device and the servers included in information management system 1 are communicably connected to each other via network N. Network N may be any communication line or network. Examples include the Internet and a mobile phone carrier network. Servers 10A, 10B, and 10C are also referred to as "server 10A, etc."

Information management system 1 is connected to terminal 41 of user U1 and terminal 42 of user U2 via network N.

Server 10A is one of the plurality of servers 10A, 10B, and 10C that perform recording related to information management by information management system 1. Server 10A is one of the plurality of servers 10A, 10B, and 10C that each have a distributed ledger. The distributed ledger in server 10A is used to store various transaction data relating to registration, use request, provision, use restriction, and deletion of information managed in information management system 1 and token grant.

Each of servers 10B and 10C is a device having the same functions as server 10A, and operates independently of server 10A. The number of servers is not limited to three, as long as the number is two or more. Server 10A, etc. are communicably connected to one another. Server 10A, etc. may be connected to one another via network N.

Although an example in which server 10A performs transmission and reception of various transaction data or various information is described here, server 10B or 10C may perform such transmission and reception.

Management server 20 is an information management server that manages user information. Management server 20 is provided with user information from terminal 41 of user U1, and holds the provided user information. Management server 20 corresponds to a typical information bank.

When user U2 requests to use user information held in management server 20, management server 20 provides the user information to terminal 42 of user U2 in response to the request. When a predetermined time elapses from the provision of the user information to terminal 42 of user U2, management server 20 restricts the use of the provided user information. When management server 20 is instructed to delete managed user information, management server 20 deletes the user information. When providing user Information to terminal 42 of user U2, management server 20 encrypts the user information. A key used for the encryption is provided from key management device 30.

Key management device 30 is a key management device that generates key information used for encryption and decryption of data and provides the key information. Specifically, when user information is provided from management server 20 to terminal 42 of user U2, key management device 30 generates a pair of an encryption key and a decryption key, provides the generated encryption key to management server 20, and provides the generated decryption key to terminal 42 of user U2. The encryption key and the decryption key may be the same.

Terminal 41 is a terminal device of user U1. User U1 Is an example of a user that registers user information of the user in information management system 1. Herein, the "user information" is electronic data including personal information (i.e. information with which user U1 is identifiable, such as name, birth date, or address) and personal (private) data (i.e. data related to user U1, such as movement history or purchase history) of user U1. Terminal 41 registers the user information of user U1 In management server 20. Information Indicating the fact that the user information is registered is managed by server 10A, etc. Terminal 41 may register, together with the user information, a use condition for the user information in management server 20. Terminal 41 is, for example, a personal computer, a smartphone, a tablet, or the like.

Terminal 42 is a terminal device of user U2. User U2 Is an example of a user that uses user information managed in information management system 1, and may be an individual or a group such as a company. The user information of user U1 is provided from management server 20 to terminal 42. Information of the request of terminal 42 to use the user information or the provision of the user information to terminal 42 is managed by server 10A, etc. The user information obtained by terminal 42 is expected to be used by user U2 for authentication, data analysis, or the like. Terminal 42 is, for example, a personal computer, a smartphone, a tablet, or the like.

A structure of server 10A or the like included in information management system 1 will be described in detail below.

Figures 2, 3:
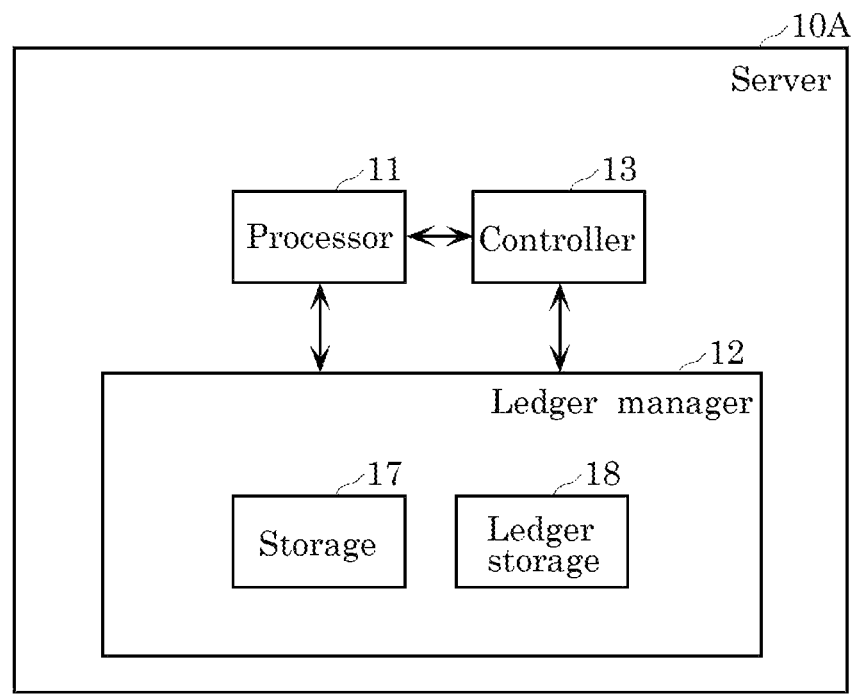
FIG. 2 is a block diagram schematically illustrating a structure of a server in the embodiment.
FIG. 3 is an explanatory diagram schematically illustrating a data structure of registration transaction data in the embodiment.

FIG. 2 is a block diagram schematically illustrating a structure of server 10A in this embodiment.

As illustrated in FIG. 2, server 10A includes processor 11, ledger manager 12, and controller 13. These functional units included in server 10A can be implemented, for example, by a central processing unit (CPU) executing a program using memory.

Processor 11 is a processor that manages various information by the distributed ledger. In the case where processor 11 receives transaction data from a device in information management system 1 or obtains transaction data generated by controller 13, processor 11 provides the received or obtained transaction data to ledger manager 12 to store the transaction data in the distributed ledger. The transaction data includes any of various transaction data relating to registration, use request, provision, use restriction, and deletion of user information and token grant. The various transaction data will be described in detail later.

Ledger manager 12 is a processor that manages the distributed ledger. Ledger manager 12 stores the transaction data provided from processor 11, in the distributed ledger. The distributed ledger stores transaction data from past to present. Based on the property that tampering with information recorded in the distributed ledger is difficult, the transaction data is managed so as not to be tampered with.

Ledger manager 12 includes storage 17 and ledger storage 18.

Storage 17 is a processor that stores, in ledger storage 18, new transaction data to be stored in the distributed ledger. Storage 17 stores new transaction data in ledger storage 18 in a form corresponding to the type of the distributed ledger. Storage 17 also transmits and receives communication data to and from storage 17 in each of the other servers from among server 10A, etc., to store the new transaction data in ledger storage 18 in the other server, too. For example, in the case where the distributed ledger is a blockchain, storage 17 generates a block including the new transaction data, and stores the generated block in ledger storage 18 synchronously among server 10A, etc.

Ledger storage 18 is a storage device that stores the distributed ledger. The distributed ledger stored in ledger storage 18 stores one or more items of transaction data, which are managed so as to resist tampering by using property such as hash values (described later).

Although an example in which the distributed ledger is a blockchain is described here, any of other types of distributed ledgers (e.g. IOTA or hash graph) may be used. The distributed ledger may or may not involve execution of a consensus algorithm (e.g. practical byzantine fault tolerance (PBFT), proof of work (PoW), or proof of stake (PoS)) when storing new data. An example of distributed ledger technology not involving execution of a consensus algorithm is Hyperledger Fabric.

Controller 13 is a processor that controls various information processing. Specifically, in the case where registration transaction data is received, controller 13 performs a process of verifying the consistency of user information included in the registration transaction data. In the case where use request transaction data is received, controller 13 performs a process of determining whether a use request satisfies a use condition.

Various transaction data which processor 11 stores in the distributed ledger, namely, (1) registration transaction data, (2) use request transaction data, (3) provision transaction data, (4) use restriction transaction data, (5) deletion transaction data, and (6) token grant transaction data, will be described below.

(1) Registration Transaction Data

FIG. 3 is an explanatory diagram schematically illustrating a data structure of registration transaction data in this embodiment. The registration transaction data is transaction data indicating the fact that user U1 registers user information in management server 20. The registration transaction data is generated by management server 20 and transmitted to server 10A or the like when user U1 registers the user Information in management server 20.

The registration transaction data corresponds to first transaction data that includes: identification information associated with user information relating to user U1; and permission or non-permission information indicating whether the provision of the user information to user U2 is permitted.

The permission or non-permission information includes, for example, information indicating: a period during which the provision of the user information is permitted; user U2 for which the provision of the user information is permitted; or whether the re-provision of the user information is permitted. In the case where each item of user information is linked with type information indicating the type of the item of user information, the permission or non-permission information may include type information of user information permitted to be provided.

Hereafter, the case where the permission or non-permission information includes type information of user information permitted to be provided will be described as an example.

As illustrated in FIG. 3, the registration transaction data includes a transaction ID, an information address, a use condition, a generation date and time, and a signature.

The transaction ID is an identifier that can uniquely identify the registration transaction data.

The information address is information indicating the address of the user information registered in management server 20. The information address corresponds to identification information associated with user Information.

The use condition is information Indicating the condition to use the user information registered in management server 20. For example, the use condition is a condition indicating a type of user information permitted to be provided to user U2 from among the user information registered in management server 20. The use condition corresponds to the type information, and is also simply referred to as "condition".

The generation date and time is information indicating the date and time at which the registration transaction data is generated.

The signature is an electronic signature by the device or person that generates the registration transaction data.

In the registration transaction data illustrated in FIG. 3, the transaction ID is "a001". The address at which the user information is registered is "add1". The use condition is that "address and name are usable" from among the registered user information. The generation date and time is "2018.10.10. 15:00:00". The signature is an electronic signature by management server 20.

(2) Use Request Transaction Data

FIG. 4 is an explanatory diagram schematically illustrating a data structure of use request transaction data in this embodiment. The use request transaction data is transaction data indicating the fact that user U2 requests to use user information. The use request transaction data is generated by terminal 42 of user U2 and transmitted to server 10A or the like when user U2 transmits a use request to use the user information.

The use request transaction data corresponds to second transaction data that includes identification information or attribute information indicating an attribute of user U1 and indicates a request to use the user information that conforms to the identification information or the attribute information.

As illustrated in FIG. 4, the use request transaction data includes a transaction ID, a user ID, an information address, use details, a generation date and time, and a signature.

The transaction ID is an identifier that can uniquely identify the use request transaction data.

The user ID is an identifier that can uniquely identify the user that uses the user Information.

The information address is information indicating the address of the user information that is registered in management server 20 and that the user requests to use. Instead of the information address, attribute Information indicating the attribute of user U1 may be used. Examples of the attribute information include age group (20 s, 30 s, 40 s, etc.), sex, prefecture of address, and the like. The same applies hereafter.

The use details are information indicating the details of the user information that the user requests to use. For example, in the case where there are one or more items of user information, the use details are information indicating an item (or items) of user information that the user requests to use from among the one or more items of user information.

The generation date and time is information Indicating the date and time at which the use request transaction data is generated.

The signature is an electronic signature by the device or person that generates the use request transaction data.

In the use request transaction data illustrated in FIG. 4, the transaction ID is "b001". Of the user information registered at address "add1", user "u002" requests to use information of "address and name". The generation date and time is "2018.11.11. 16:00:00". The signature is an electronic signature by user U2. The user ID of user U2 is "u002".

(3) Provision Transaction Data

FIG. 5 is an explanatory diagram schematically illustrating a data structure of provision transaction data in this embodiment. The provision transaction data is transaction data indicating the fact that user information is provided from management server 20 to user U2. The provision transaction data is generated by management server 20 and transmitted to server 10A or the like when the user information is provided from management server 20 to user U2.

The provision transaction data corresponds to third transaction data that includes identification information or attribute information related to user information transmitted and type information in the case where the user information is transmitted from management server 20 to terminal 42 of user U2.

As illustrated in FIG. 5, the provision transaction data includes a transaction ID, a user ID, an information address, provision details, a generation date and time, and a signature.

The transaction ID is an identifier that can uniquely identify the provision transaction data.

The user ID is an identifier that can uniquely identify the user to which the user information is provided.

The information address is information indicating the address of the user information registered in management server 20 and provided from management server 20 to the user.

The provision details are information indicating the details of the user information provided from management server 20 to the user. For example, in the case where there are one or more items of user information, the provision details are information indicating an item (or items) of user information provided to the user from among the one or more items of user information.

The generation date and time is information Indicating the date and time at which the provision transaction data is generated.

The signature is an electronic signature by the device or person that generates the provision transaction data.

In the provision transaction data illustrated in FIG. 5, the transaction ID is "c001". Of the user information registered at address "add1", user information of "address and name" is provided to user "u002". The generation date and time is "2018.11.11 17:00:00". The signature is an electronic signature by management server 20.

(4) Use Restriction Transaction Data

FIG. 6 is an explanatory diagram schematically illustrating a data structure of use restriction transaction data in this embodiment. The use restriction transaction data is transaction data indicating the fact that the use of user information provided to user U2 Is restricted. The use restriction transaction data is generated by management server 20 and transmitted to server 10A or the like when, as a result of a predetermined time elapsing from the provision of the user information from management server 20 to user U2, the use of the provided user information is restricted.

The use restriction transaction data corresponds to fourth transaction data that includes restriction information indicating that the use of provided user information is restricted.

As illustrated in FIG. 6, the use restriction transaction data includes a transaction ID, a user ID, an information address, restriction details, a generation date and time, and a signature.

The transaction ID is an identifier that can uniquely identify the use restriction transaction data.

The user ID is an identifier that can uniquely identify the user to which the user information is provided.

The information address is information indicating the address of the user information that is provided from management server 20 to the user and subjected to use restriction.

The restriction details are information indicating the details of the user information subjected to use restriction. For example, in the case where there are one or more items of user information, the restriction detail are information indicating an item (or items) of user information subjected to use restriction from among the one or more items of user information. The restriction details correspond to restriction information.

The generation date and time is information indicating the date and time at which the use restriction transaction data is generated.

The signature is an electronic signature by the device or person that generates the use restriction transaction data.

Instead of designating the information address and the restriction details of the user information, the transaction ID (see FIG. 5) of the provision transaction data when providing the user information may be designated.

In the use restriction transaction data illustrated in FIG. 6, the transaction ID is "d001". Of the user information registered at address "add1", the use of user information of "address and name" provided to user "u002" is restricted. The generation date and time is "2019.5.11 17:00:00". The signature is an electronic signature by management server 20.

(5) Deletion Transaction Data

FIG. 7 is an explanatory diagram schematically illustrating a data structure of deletion transaction data in this embodiment. The deletion transaction data is transaction data indicating the fact that user information registered in management server 20 is deleted. The deletion transaction data is generated by management server 20 and transmitted to server 10A or the like when the user information registered in management server 20 is deleted.

The deletion transaction data corresponds to fifth transaction data that includes an identifier indicating user information managed in information management system 1 and deleted and deletion information indicating that the user information is deleted.

As illustrated in FIG. 7, the deletion transaction data includes a transaction ID, an information address, deletion information, a generation date and time, and a signature.

The transaction ID is an identifier that can uniquely identify the deletion transaction data.

The information address is information indicating the address of the user information registered in management server 20 and deleted.

The deletion information is information indicating that the deletion transaction data concerns the deletion of the user information.

The generation date and time is information indicating the date and time at which the deletion transaction data is generated.

The signature is an electronic signature by the device or person that generates the deletion transaction data.

In the deletion transaction data illustrated in FIG. 7, the transaction ID is "e001". The user information registered at address "add1" is deleted. The generation date and time is "2019.5.11 17:00:00". The signature is an electronic signature by management server 20.

(6) Token Grant Transaction Data

FIG. 8 is an explanatory diagram schematically illustrating a data structure of token grant transaction data in this embodiment. The token grant transaction data is transaction data indicating transfer of a token between users, and is used to grant a token to user U1 providing user information. The token grant transaction data is generated by management server 20 and transmitted to server 10A or the like when the user information is registered in management server 20.

The token grant transaction data corresponds to sixth transaction data including provision information for granting a token to a first user.

As illustrated in FIG. 8, the token grant transaction data includes a transaction ID, a source address, a destination address, a generation date and time, and a signature. The source address and the destination address correspond to provision information.

The transaction ID is an identifier that can uniquely identify the token grant transaction data.

The source address is information indicating the address for identifying the user that provides the token (i.e. source) in the token grant. For example, the source is management server 20.

The destination address is information indicating the address for identifying the user to which the token is provided (i.e. destination) in the token grant. For example, the destination is user U1.

The generation date and time is information indicating the date and time at which the token grant transaction data is generated.

The signature is an electronic signature by the device or person that generates the token grant transaction data.

In the token grant transaction data illustrated in FIG. 8, the transaction ID is "f001". The token grant is from the user (e.g. management server 20) identified by source address "add5" to the user (e.g. user U1) identified by destination address "add6". The generation date and time is "2018.10.10. 15:00:00". The signature is an electronic signature by management server 20.

Processes by server 10A or the like and information management system 1 having the foregoing structures will be described below.

Processes in (1) registration of user information, (2) use request and provision of user information, (3) use restriction of user information, and (4) deletion of user information will be described in this order below.

(1) Registration of User Information

Figure 9:
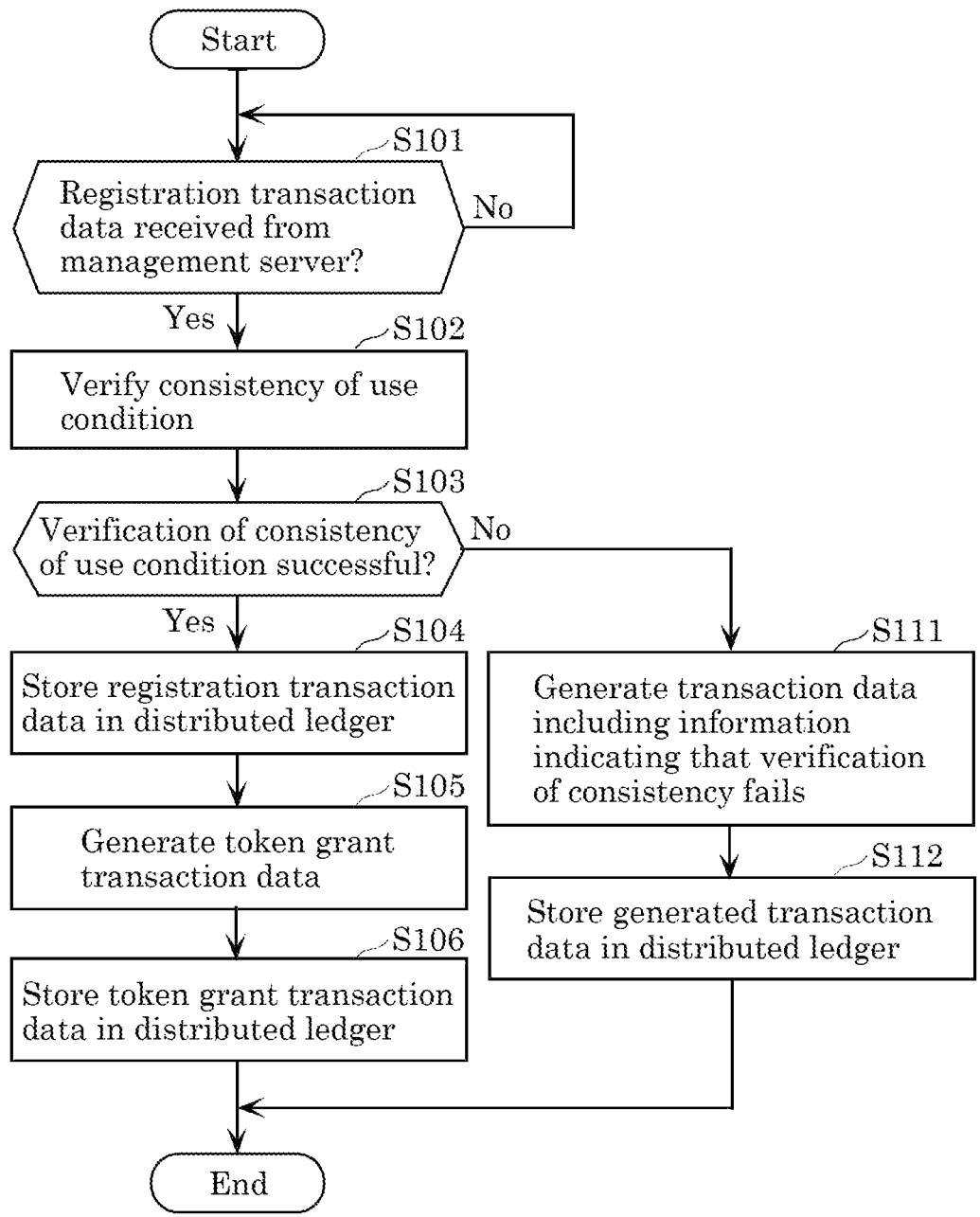
FIG. 9 is a flowchart illustrating a process related to registration of user information performed by the server in the embodiment.

FIG. 9 is a flowchart illustrating a process related to registration of user information performed by server 10A or the like in this embodiment.

In Step S101, processor 11 determines whether registration transaction data is received from management server 20. In the case where processor 11 determines that the registration transaction data is received (Step S101: Yes), the process advances to Step S102. Otherwise (Step S101: No), Step S101 is performed again. That is, processor 11 is in a standby state in Step S101 until the registration transaction data is received.

In Step S102, controller 13 verifies the consistency of a use condition. Specifically, controller 13 verifies whether the use condition included in the registration transaction data received in Step S101 is consistent with the use condition set by user U1 for the user information of user U1.

In Step S103, controller 13 determines whether the verification of the consistency of the use condition in Step S102 is successful. In the case where the verification is successful (Step S103: Yes), the process advances to Step S104. Otherwise (Step S103: No), the process advances to Step S111.

In Step S104, controller 13 provides the registration transaction data received in Step S101 to ledger manager 12, to store the registration transaction data in the distributed ledger. Controller 13 also transmits the registration transaction data to other servers 10B, etc., thus storing the registration transaction data in the distributed ledger in all servers 10A, etc.

In Step S105, controller 13 generates token grant transaction data for granting a token from management server 20 to user U1.

In Step S106, controller 13 provides the token grant transaction data generated in Step S105 to ledger manager 12, to store the token grant transaction data in the distributed ledger. Controller 13 also transmits the token grant transaction data to other servers 10B, etc., thus storing the token grant transaction data in the distributed ledger in all servers 10A, etc.

In Step S111, controller 13 generates transaction data (not illustrated) including information indicating that the verification of the consistency of the use condition is not successful (i.e. the verification fails).

In Step S112, controller 13 provides the transaction data generated in Step S111 to ledger manager 12, to store the transaction data in the distributed ledger. Controller 13 also transmits the transaction data to other servers 10B, etc., thus storing the transaction data in the distributed ledger in all servers 10A, etc.

After Step S106 or S112, the series of processes illustrated in FIG. 9 ends.

Figure 10:
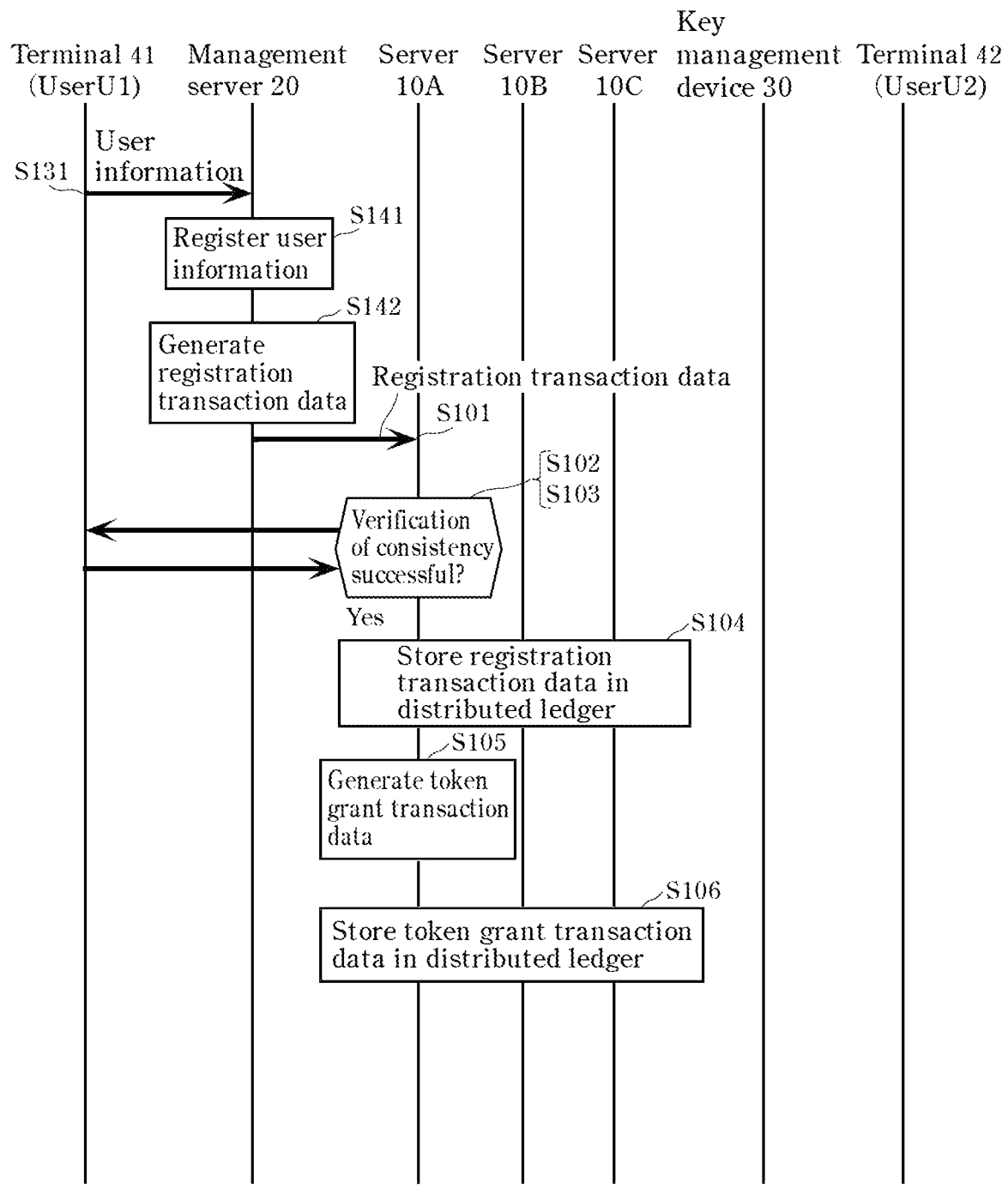
FIG. 10 is a sequence diagram illustrating an overall process of the information management system related to registration of user information in the embodiment.

FIG. 10 is a sequence diagram illustrating an overall process of information management system 1 related to registration of user information in this embodiment. In FIG. 10, the same processes as those in the flowchart in FIG. 9 are given the same reference signs as in FIG. 9, and their detailed description is omitted. FIG. 10 illustrates the case where the verification of the consistency of the use condition is successful (Step S103 in FIG. 9: Yes).

In Step S131, terminal 41 transmits the user information of user U1 together with the use condition to management server 20, based on operation by user U1. Management server 20 receives the user information and the use condition from terminal 41.

In Step S141, management server 20 registers the user information and the use condition received from terminal 41, as information to be managed.

In Step S142, management server 20 generates registration transaction data indicating that the user information is registered, and transmits the generated registration transaction data to server 10A or the like.

Subsequently, server 10A or the like receives the registration transaction data transmitted in Step S142, and performs processes such as storing the registration transaction data in the distributed ledger and granting a token (Steps S101 to S112).

(2) Use Request and Provision of User Information

Figure 11:
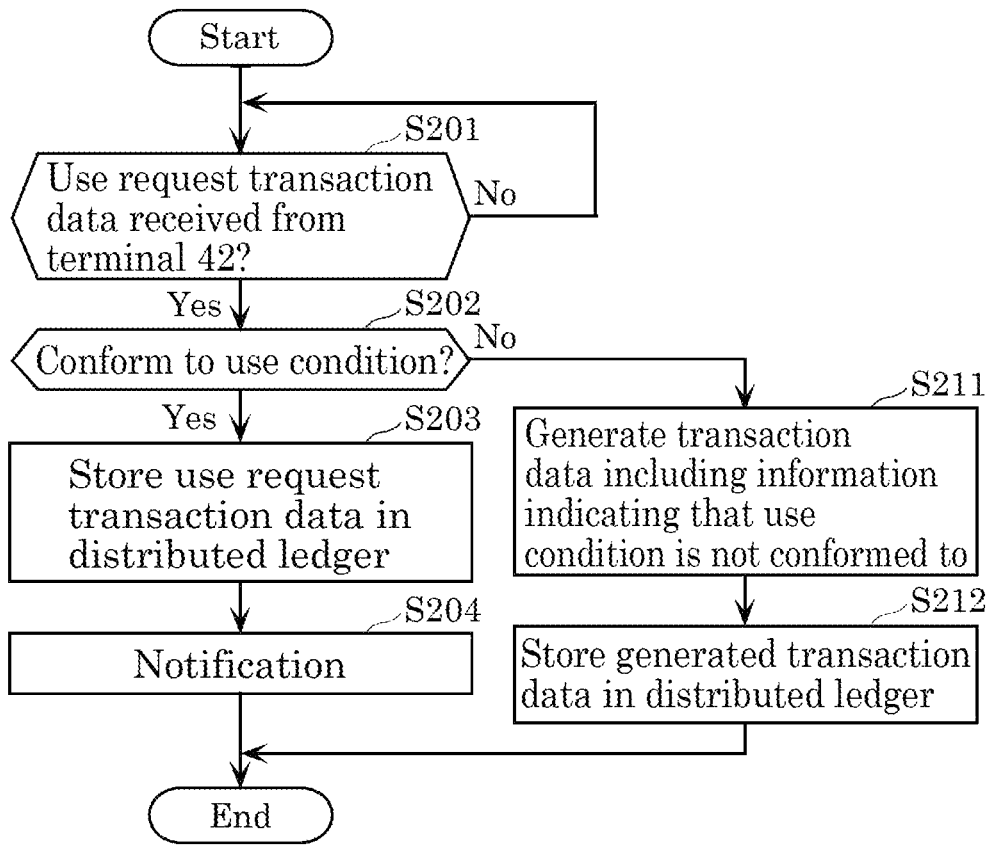
FIG. 11 is a flowchart illustrating a process related to use request of user information performed by the server in the embodiment.

FIG. 11 is a flowchart illustrating a process related to use request of user information performed by server 10A or the like in this embodiment.

In Step S201, processor 11 determines whether use request transaction data is received from terminal 42 of user U2. In the case where processor 11 determines that the use request transaction data is received (Step S201: Yes), the process advances to Step S202. Otherwise (Step S201: No), Step S201 is performed again. That is, processor 11 is in a standby state in Step S201 until the use request transaction data is received.

In Step S202, controller 13 determines whether the user information and the use details included in the use request transaction data received in Step S201 conform to the use condition for the user information managed by management server 20. In the case where controller 13 determines that the user information and the use details conform to the use condition (Step S202: Yes), the process advances to Step S203. Otherwise (Step S202: No), the process advances to Step S211.

In Step S203, controller 13 provides the use request transaction data received in Step S201 to ledger manager 12, to store the use request transaction data in the distributed ledger. Controller 13 also transmits the use request transaction data to other servers 10B, etc., thus storing the use request transaction data in the distributed ledger in all servers 10A, etc.

In Step S204, controller 13 notifies management server 20 that user U2 requests to use the user information of user U1. Having received the notification, management server 20 transmits the user information of user U1 managed, to terminal 42 of user U2.

In Step S211, controller 13 generates transaction data (not illustrated) including information indicating that the use details do not conform to the use condition.

In Step S212, controller 13 provides the transaction data generated in Step S211 to ledger manager 12, to store the transaction data in the distributed ledger. Controller 13 also transmits the transaction data to other servers 10B, etc., thus storing the transaction data in the distributed ledger in all servers 10A, etc.

After Step S204 or S212, the series of processes illustrated in FIG. 11 ends.

Figure 12:
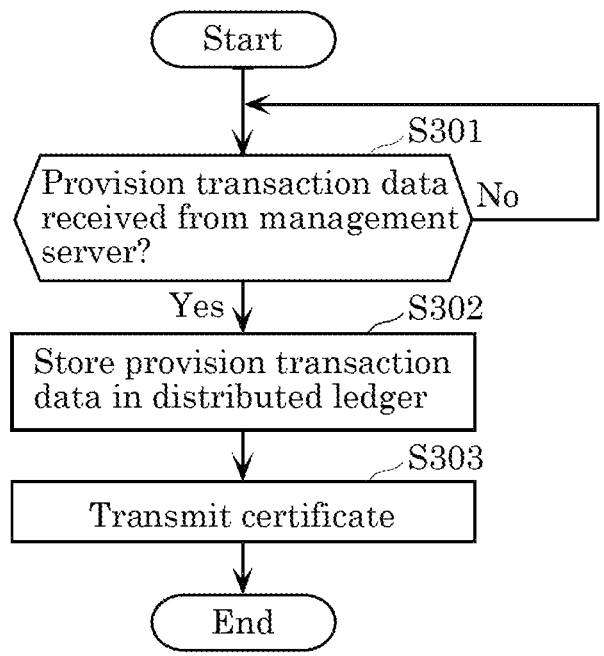
FIG. 12 is a flowchart illustrating a process related to provision of user information performed by the server in the embodiment.

FIG. 12 is a flowchart illustrating a process related to provision of user information performed by server 10A or the like in this embodiment.

In Step S301, processor 11 determines whether provision transaction data indicating that the user information of user U1 is provided from management server 20 to terminal 42 of user U2 is received from management server 20. In the case where processor 11 determines that the provision transaction data is received (Step S301: Yes), the process advances to Step S302. Otherwise (Step S301: No), Step S301 is performed again. That is, processor 11 is in a standby state in Step S301 until the provision transaction data is received.

In Step S302, controller 13 provides the provision transaction data received in Step S301 to ledger manager 12, to store the provision transaction data in the distributed ledger. Controller 13 also transmits the provision transaction data to other servers 10B, etc., thus storing the provision transaction data in the distributed ledger in all servers 10A, etc.

In Step S303, controller 13 transmits a certificate attesting that user U2 or terminal 42 is authorized to have the user information of user U1, to user U2.

After Step S303, the series of processes illustrated in FIG. 12 ends.

Figure 13:
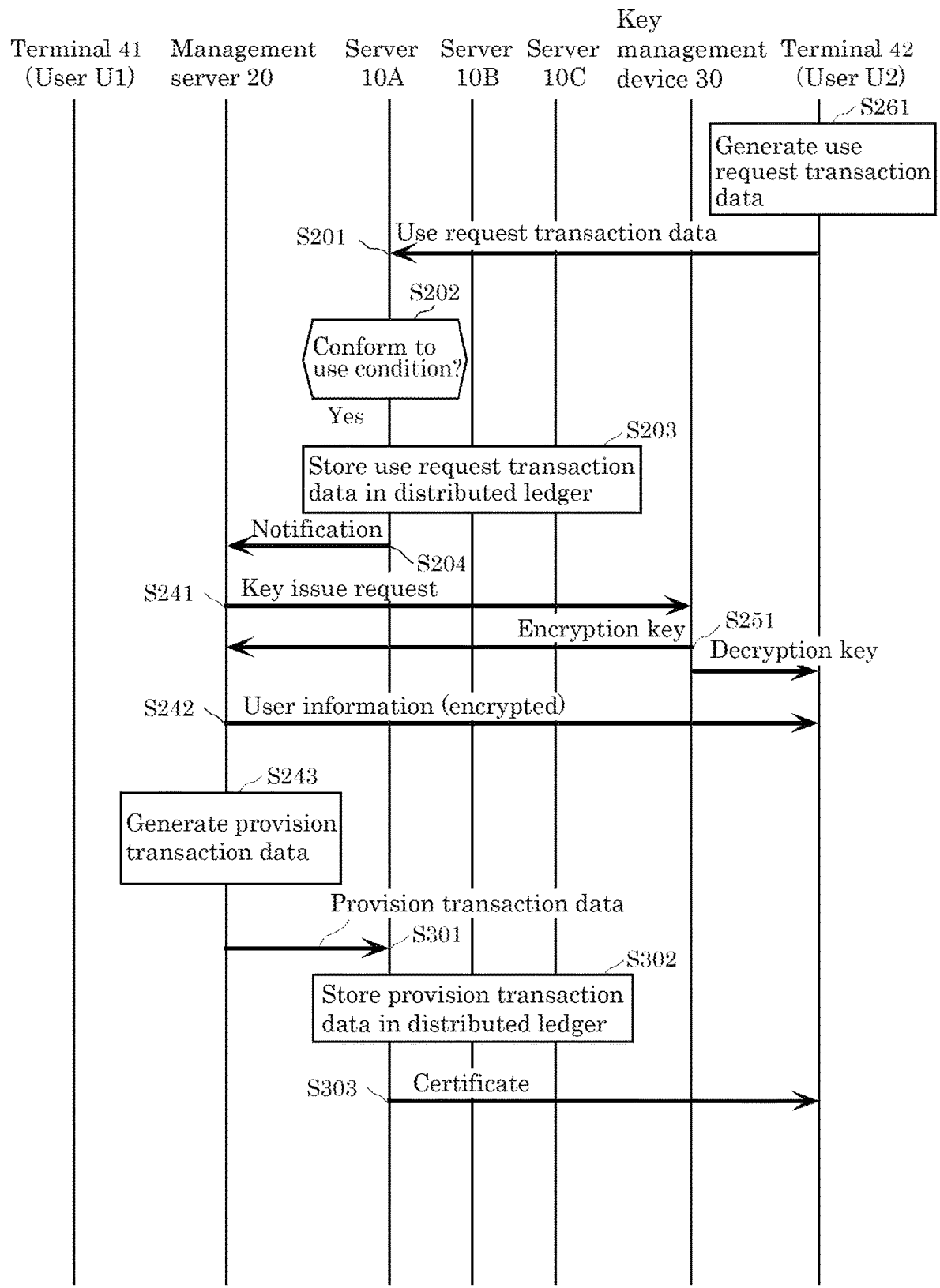
FIG. 13 is a sequence diagram illustrating an overall process of the information management system related to use request and provision of user information in the embodiment.

FIG. 13 is a sequence diagram illustrating an overall process of information management system 1 related to use request and provision of user information in this embodiment. FIG. 13 illustrates the case where the user information and the use details included in the use request transaction data conform to the use condition (Step S202 in FIG. 11: Yes).

In Step S261, terminal 42 generates use request transaction data for requesting to use the user information of user U1, and transmits the generated use request transaction data to server 10A or the like.

Server 10A or the like receives the transmitted use request transaction data, and determines that the user information and the use details conform to the use condition. Server 10A or the like then stores the use request transaction data in the distributed ledger, and notifies management server 20 (Steps S201 to S204).

In Step S241, management server 20 transmits a key issue request to key management device 30. The key issue request is information requesting to issue keys used for encryption and decryption of the user Information of user U1 when transmitting the user information to terminal 42 of user U2.

In Step S251, key management device 30 receives the key issue request transmitted in Step S241, and generates a pair of an encryption key used to encrypt the user information and a decryption key used to decrypt the user information. Key management device 30 transmits the generated encryption key to management server 20, and transmits the generated decryption key to terminal 42. Management server 20 receives the encryption key transmitted from key management device 30. Terminal 42 receives the decryption key transmitted from key management device 30.

In Step S242, management server 20 encrypts the user information using the encryption key received in Step S251, and transmits the encrypted user information to terminal 42. Thus, management server 20 provides the user information of user U1 to user U2. Terminal 42 receives the transmitted user information, and decrypts the user information using the decryption key received in Step S251 to obtain the user information. For example, the user information obtained by terminal 42 is expected to be used by user U2 for authentication, data analysis, or the like.

In Step S243, management server 20 generates provision transaction data indicating that the user information of user U1 is provided, and transmits the generated provision transaction data to server 10A or the like.

Subsequently, server 10A or the like receives the transmitted provision transaction data, stores the received provision transaction data in the distributed ledger, and transmits a certificate to terminal 42 (Steps S301 to S303).

(3) Use Restriction of User Information

Figure 14:
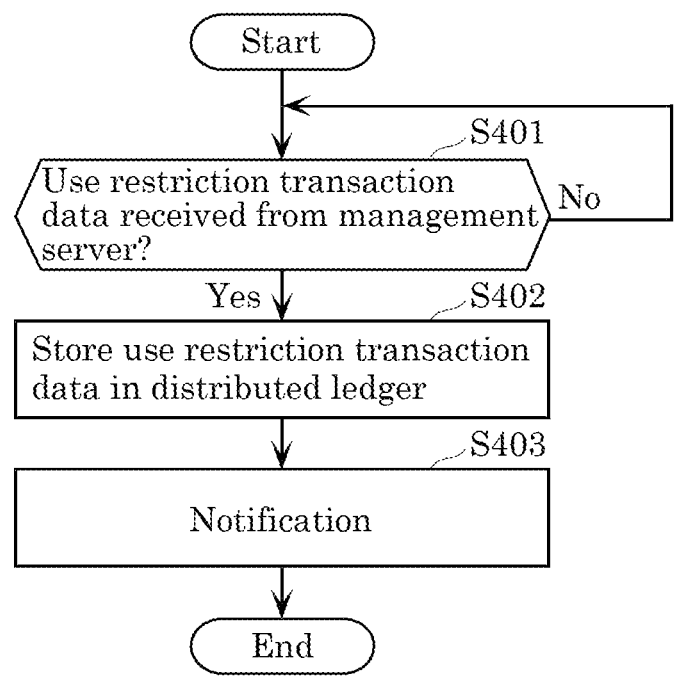
FIG. 14 is a flowchart illustrating a process related to data use restriction performed by the server in the embodiment.

FIG. 14 is a flowchart illustrating a process related to use restriction of data performed by the server in this embodiment.

In Step S401, processor 11 determines whether use restriction transaction data Indicating that the use of the user information of user U1 is restricted is received from management server 20. In the case where processor 11 determines that the use restriction transaction data is received (Step S401: Yes), the process advances to Step S402. Otherwise (Step S401: No), Step S401 is performed again. That is, processor 11 is in a standby state in Step S401 until the use restriction transaction data is received.

In Step S402, controller 13 provides the use restriction transaction data received in Step S401 to ledger manager 12, to store the use restriction transaction data in the distributed ledger. Controller 13 also transmits the use restriction transaction data to other servers 10B, etc., thus storing the use restriction transaction data in the distributed ledger in all servers 10A, etc.

In Step S403, controller 13 notifies terminal 42 that the use of the user information is restricted. Having received the notification of the use restriction, terminal 42 restricts the use of the user information. Subsequently, terminal 42 cannot use the user information the use of which is restricted.

After Step S403, the series of processes illustrated in FIG. 14 ends.

Figure 15:
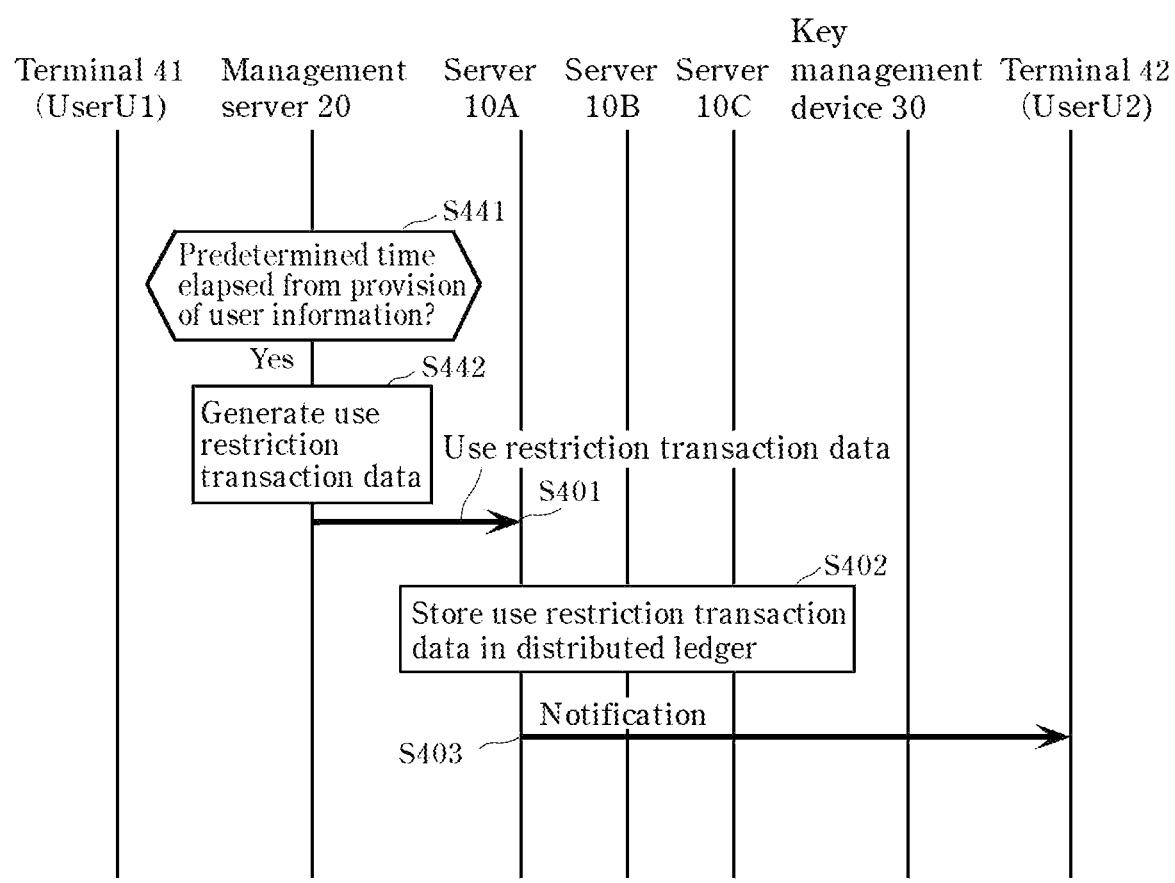
FIG. 15 is a sequence diagram illustrating an overall process of the information management system related to use restriction of user information in the embodiment.

FIG. 15 is a sequence diagram illustrating an overall process of information management system 1 related to use restriction of user information in this embodiment. FIG. 15 illustrates the case where a predetermined time has elapsed from the provision of the user information from management server 20 to terminal 42.

In Step S441, management server 20 determines whether the predetermined time has elapsed from the provision of the user information to terminal 42. In the case where management server 20 determines that the predetermined time has elapsed (Step S441: Yes), the process advances to Step S442. Otherwise, Step S441 is performed again. That is, management server 20 is in a standby state in Step S441 until the predetermined time elapses.

In Step S442, management server 20 generates, based on the determination that the predetermined time has elapsed in Step S441, use restriction transaction data indicating that the use of the user information provided to terminal 42 is restricted, and transmits the generated use restriction transaction data to server 10A or the like. Subsequently, server 10A or the like receives the transmitted use restriction transaction data, and stores the received use restriction transaction data in the distributed ledger. Server 10A or the like also notifies terminal 42 of the use restriction (Steps S401 to S403).

(4) Deletion of User Information

Figure 16:
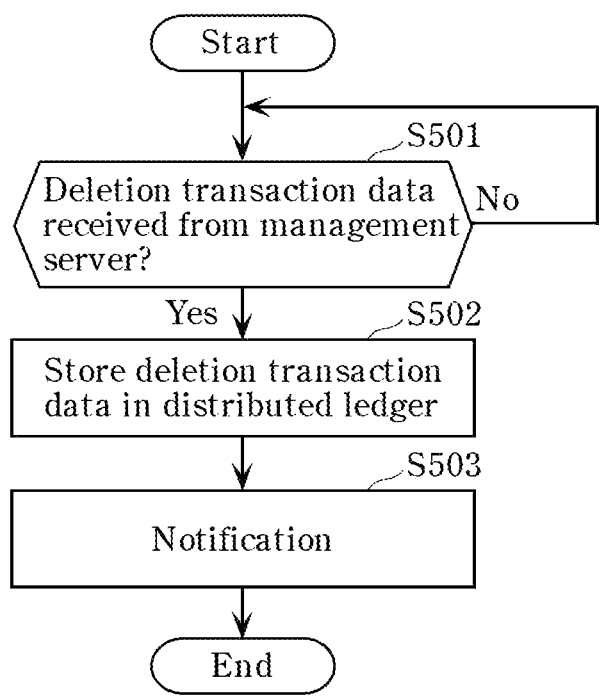
FIG. 16 is a flowchart illustrating a process related to deletion of user information performed by the server in the embodiment.

FIG. 16 is a flowchart illustrating a process related to deletion of user information performed by server 10A or the like in this embodiment.

In Step S501, processor 11 determines whether deletion transaction data indicating that the user information of user U1 is deleted in management server 20 is received from management server 20. In the case where processor 11 determines that the deletion transaction data is received (Step S501: Yes), the process advances to Step S502. Otherwise (Step S501: No), Step S501 is performed again. That is, processor 11 is in a standby state in Step S501 until the deletion transaction data is received.

In Step S502, controller 13 provides the deletion transaction data received in Step S501 to ledger manager 12, to store the deletion transaction data in the distributed ledger. Controller 13 also transmits the deletion transaction data to other servers 10B, etc., thus storing the deletion transaction data in the distributed ledger in all servers 10A, etc.

In Step S503, controller 13 notifies terminal 42 that the user information is deleted. Having received the notification of the deletion, terminal 42 deletes the user information. Subsequently, terminal 42 cannot use the deleted user information.

After Step S503, the series of processes illustrated in FIG. 16 ends.

Figure 17:
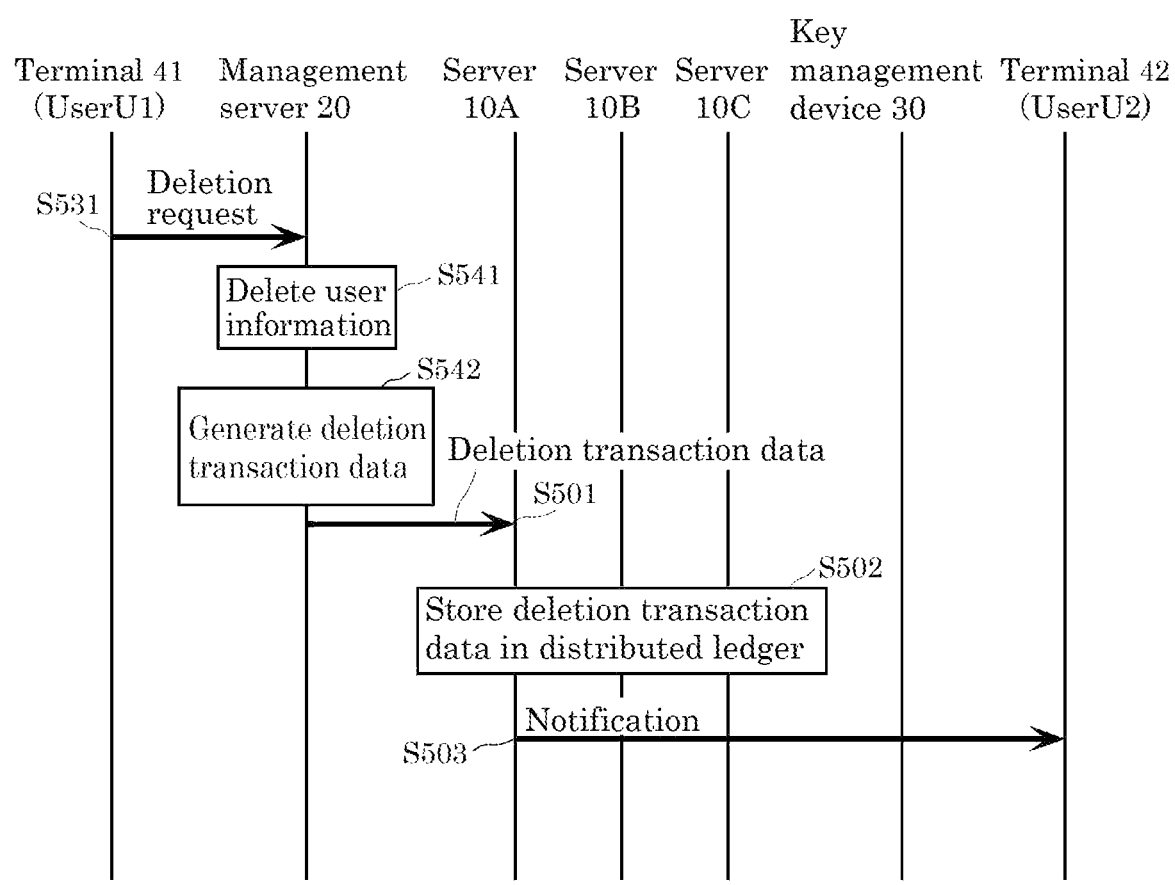
FIG. 17 is a sequence diagram illustrating an overall process of the information management system related to deletion of user information in the embodiment.

FIG. 17 is a sequence diagram illustrating an overall process of information management system 1 related to deletion of user information in this embodiment.

In Step S531, terminal 41 transmits, to management server 20, a deletion request to delete the user information of user U1 registered in management server 20, based on operation by user U1. Management server 20 receives the deletion request.

In Step S541, management server 20 deletes the managed user information of user U1.

In Step S542, management server 20 generates deletion transaction data Indicating that the user information of user U1 is deleted in Step S541, and transmits the generated deletion transaction data to server 10A or the like.

Subsequently, server 10A or the like receives the transmitted deletion transaction data, and stores the received deletion transaction data in the distributed ledger. Server 10A or the like also notifies terminal 42 of the deletion (Steps S501 to S503).

Although this embodiment describes the case where the user information is transmitted from terminal 41 to management server 20 and held in management server 20, the user information may be held in terminal 41. In this case, the registration transaction data is generated by terminal 41 and transmitted to server 10A or the like, and the signature in the registration transaction data is an electronic signature by terminal 41.

Although this embodiment describes the case where the use restriction transaction data is generated by management server 20 as a result of the elapse of the predetermined time, the use restriction transaction data may be generated by terminal 42 as a result of the elapse of the predetermined time. In this case, the use restriction transaction data is transmitted from terminal 41 to server 10A or the like, and the electronic signature in the use restriction transaction data is an electronic signature by terminal 42 of user U2.

Variation of Embodiment

The control method of the information management system in the foregoing embodiment may be described as follows, without being limited thereto.

Figure 18:
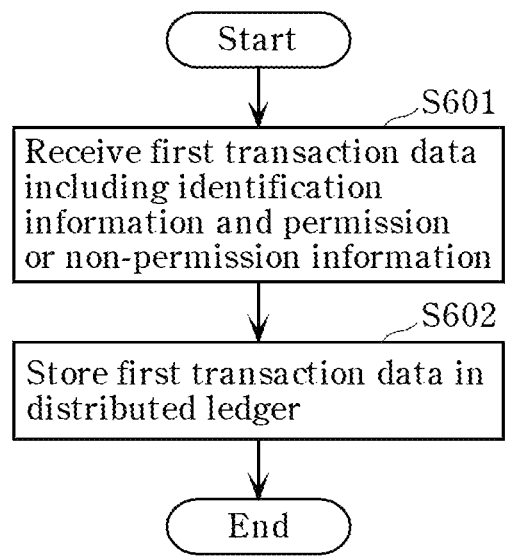
FIG. 18 is a flowchart illustrating a process of a server in a variation of the embodiment.

FIG. 18 is a flowchart illustrating a process by a server (also referred to as "control method by a server") in this variation.

The series of processes illustrated in FIG. 18 is a control method that, in an information management system including a plurality of servers each having a distributed ledger, is executed by a server from among the plurality of servers.

In Step S601, the server receives first transaction data that includes identification information and permission or non-permission information, the Identification information being associated with user information that is managed in the information management system and relates to a first user, the permission or non-permission information indicating whether provision of the user information to a second user is permitted.

In Step S602, the server stores the first transaction data received in Step S601, in the distributed ledger in each of the plurality of servers.

Figure 19:
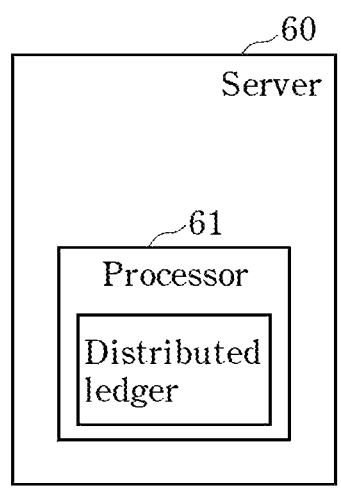
FIG. 19 is a block diagram schematically illustrating a structure of the server in the variation of the embodiment.

FIG. 19 is a block diagram schematically illustrating a structure of the server from among the plurality of servers included in the information management system in this variation.

Server 60 illustrated in FIG. 19 includes processor 61. Server 60 corresponds to server 10A in the embodiment.

Processor 61 receives first transaction data that includes identification information and permission or non-permission information, the Identification information being associated with user information that is managed in the information management system and relates to a first user, the permission or non-permission information indicating whether provision of the user information to a second user is permitted. Processor 61 then stores the first transaction data received, in the distributed ledger in each of the plurality of servers.

Thus, in the information management system, communication that can take place before use of personal data can be suppressed.

A blockchain in the foregoing embodiment or variations will be described below.

Figure 20:
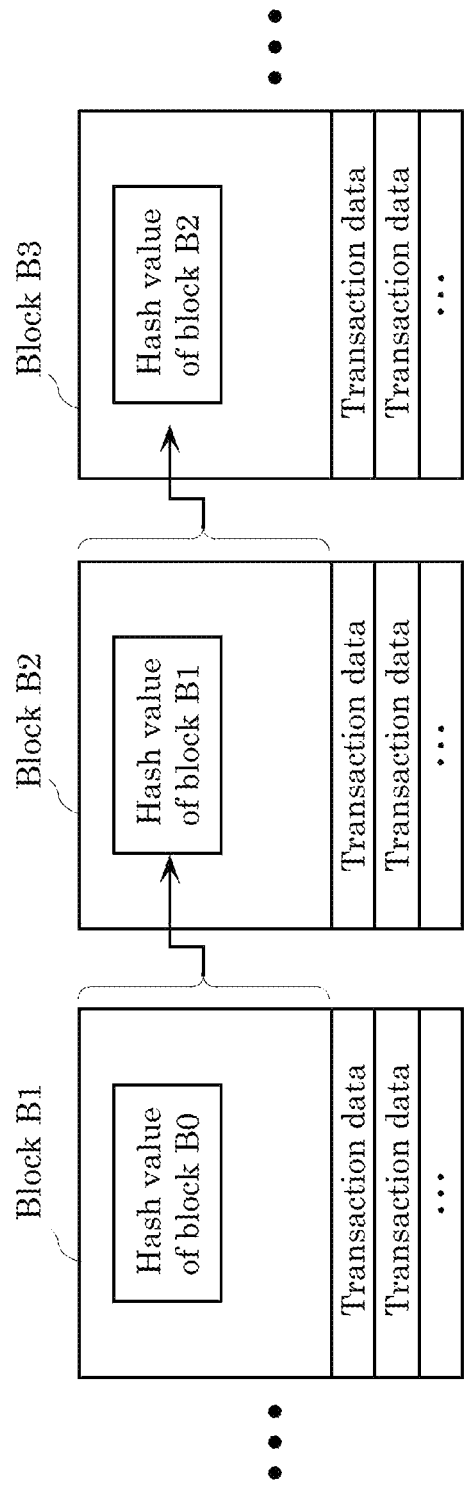
FIG. 20 is an explanatory diagram illustrating a data structure of a blockchain.

FIG. 20 is an explanatory diagram illustrating a data structure of a blockchain.

The blockchain is formed by connecting blocks as recording units in a chain. Each block has a plurality of items of transaction data and a hash value of the immediately previous block. Specifically, block B2 includes a hash value of block B1 preceding block B2. A hash value calculated from a plurality of items of transaction data and the hash value of block B1 included in block B2 is included in block B3 as a hash value of block B2. By connecting blocks in a chain where each block includes information of the previous block as a hash value in this way, tampering with recorded transaction data can be effectively prevented.

If past transaction data is changed, the hash value of the block will end up being different from the value before the change. To disguise the tampered block as proper, all subsequent blocks need to be recreated. Such operation is practically very difficult. This property is used to ensure the difficulty of tampering with blockchains.

Figure 21:
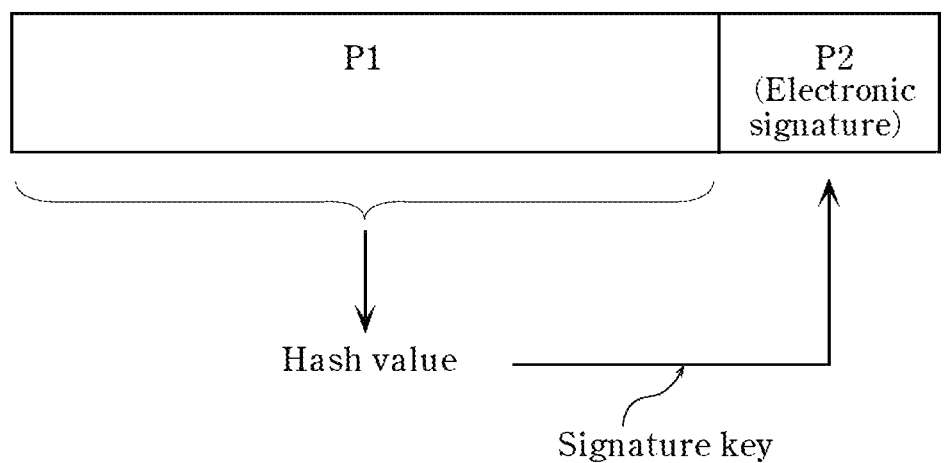
FIG. 21 is an explanatory diagram illustrating a data structure of transaction data.

FIG. 21 is an explanatory diagram illustrating a data structure of transaction data.

The transaction data illustrated in FIG. 21 includes transaction body P1 and electronic signature P2. Transaction body P1 is a data body included in the transaction data. Electronic signature P2 is generated by signing a hash value of transaction body P1 using a signature key of the generator of the transaction data, i.e. by encrypting the hash value using a private key of the generator.

Since the transaction data includes electronic signature P2, tampering is substantially impossible. Tampering with the transaction body is thus prevented.

As described above, with the control method according to each of the foregoing embodiment and variations, the server stores, in the distributed ledger, the first transaction data including the permission or non-permission information relating to the use of the user information managed in the information management system. This eliminates the need for the server to perform information exchange for consent to use before each use of personal data. Thus, communication for the information exchange can be suppressed.

Moreover, since tampering with the transaction data stored in the distributed ledger is substantially impossible, the permission or non-permission information relating to the use of the user information managed in the information management system is appropriately managed. If, in information exchange for consent to use, there is a contradiction between the individual and the information bank or between a company that uses the personal data and the information bank, the personal data may not be used appropriately. With the control method according to an aspect of the present disclosure, the permission or non-permission information is stored in the distributed ledger and tampering is substantially impossible, so that such a contradiction can be prevented.

The server stores, in the distributed ledger, the second transaction data indicating a request to use the user information managed in the information management system. Therefore, the information indicating the fact that the use is requested is appropriately managed without being substantially tampered with. The server can thus suppress communication that can take place before use of personal data, while appropriately managing the information indicating the fact that the use of the user information is requested.

The server determines, for the user information which the second user requests to use, whether to permit the use based on the condition included in the permission or non-permission information. Since the permission or non-permission information is generated based on the first user's determination and stored in the distributed ledger, the permission or non-permission information is appropriately managed without being substantially tampered with. The server can thus suppress communication that can take place before use of personal data, when allowing the second user to use the user information according to the first user's determination.

The server stores, in the distributed ledger, the third transaction data indicating that the user information is transmitted to the second user. Therefore, the information indicating the fact that the user information is transmitted to the second user is appropriately managed without being substantially tampered with. The server can thus suppress communication that can take place before use of personal data, while appropriately managing the information indicating the fact that the user information is transmitted to the second user. There is also an advantage that the first user can know which company has used the user information of the first user in what way.

The server stores, in the distributed ledger, the fourth transaction data indicating that the use of the provided user information is restricted as a result of the predetermined time elapsing from the provision of the user information to the second user. Therefore, the information indicating the fact that the use is restricted is appropriately managed without being substantially tampered with. The server can thus suppress communication that can take place before use of personal data, while appropriately managing the information indicating the fact that the use of the user information is restricted.

The server stores, in the distributed ledger, the fifth transaction data indicating that the user information is deleted. Therefore, the information indicating the fact that the user information is deleted is appropriately managed without being substantially tampered with. The server can thus suppress communication that can take place before use of personal data, while appropriately managing the information indicating the fact that the user information is deleted.

The server grants the token to the first user in the case where the permission or non-permission information for the provision of the user information of the first user is stored in the distributed ledger. The token is value information managed by the distributed ledger, and can be used, for example, as a substitute for monetary value. This has an effect of facilitating the management of the user information in the information management system and promoting the utilization of the user information managed.

The server appropriately manages the information indicating the period during which the provision of the user information is permitted, the user for which the provision of the user Information is permitted, or whether the re-provision of the user information is permitted, without substantial tampering. This eliminates the need for the server to perform the foregoing information exchange for consent to use before each use of personal data. Thus, communication for the information exchange can be suppressed.

The server appropriately manages the type information of the user information permitted to be provided, without substantial tampering. This eliminates the need for the server to perform the foregoing information exchange for consent to use before each use of personal data. Thus, communication for the information exchange can be suppressed.

Each of the structural elements in the foregoing embodiment may be configured in the form of an exclusive hardware product, or may be realized by executing a software program suitable for the structural element. Each of the structural elements may be realized by means of a program executing unit, such as a CPU and a processor, reading and executing the software program recorded on a recording medium such as a hard disk or semiconductor memory. For example, software for realizing the content management system, etc. according to the foregoing embodiment is the following program.

The program causes a computer to execute a control method that, in an information management system including a plurality of servers each having a distributed ledger, is executed by a server from among the plurality of servers, the control method including: receiving first transaction data that includes identification information and permission or non-permission Information, the identification information being associated with user information that is managed in the information management system and relates to a first user, the permission or non-permission information indicating whether provision of the user information to a second user is permitted; and storing the first transaction data received, in the distributed ledger in each of the plurality of servers.

While a control method, a server, an information management system, etc. according to one or more aspects have been described above by way of embodiments, the present disclosure is not limited to such embodiments. Other modifications obtained by applying various changes conceivable by a person skilled in the art to the embodiments and any combinations of the structural elements in different embodiments without departing from the scope of the present disclosure are also included in the scope of one or more aspects.

INDUSTRIAL APPLICABILITY

The present disclosure can be used in information management systems for managing user information.

The invention claimed is:

1. A control method in an information management system including a server and a management server, the control method comprising:
    receiving, from a first device used by a first user, (i) user information including private data or personal data of the first user and (ii) permission or non-permission information indicating whether provision of the user information to a second user is permitted;
    recording the user information and the permission or non-permission information to a memory;
    generating first transaction data that includes (i) identification information being associated with the user information and relates to the first user and indicating an address of the user information registered in the management server and (ii) the permission or non-permission information;
    receiving, from the management server, the first transaction data that includes the identification information that indicates the address of the user information registered in the management server and the permission or non-permission information;
    verifying whether the permission or non-permission information included in the first transaction data is consistent with permission or non-permission information set by the first user; and
    storing, when the verifying of consistency is successful, the first transaction data that includes the identification information that indicates the address of the user information registered in the management server and that is received in a distributed ledger.

2. The control method according to claim 1, further comprising:
    receiving, from a terminal of the second user, second transaction data that includes the identification information or attribute information indicating an attribute of the first user, and indicates a request to use the user information that conforms to the identification information or the attribute information; and
    storing the second transaction data received, in the distributed ledger.

3. The control method according to claim 2,
    wherein the user information comprises one or more items of user information,
    the permission or non-permission information includes a condition for an item of user information permitted to be provided to the second user from among the one or more items of user information,
    the second transaction data further includes request information indicating an item of user information that relates to the first user associated with the identification information or the first user having the attribute indicated by the attribute information and that is requested by the second user to be provided, and
    the control method further comprises:
    determining whether the request information included in the second transaction data conforms to the condition included in the permission or non-permission information; and
    storing, in the distributed ledger, the second transaction data received, when the request information is determined to conform to the condition.

4. The control method according to claim 2, further comprising:
    receiving, when the user information is transmitted to the terminal of the second user based on the receiving of the second transaction data, third transaction data including the identification information or the attribute information related to the user information transmitted; and
    storing the third transaction data received, in the distributed ledger.

5. The control method according to claim 3, further comprising:
    receiving, when a predetermined time elapses from transmission of the item of user information to the terminal of the second user, fourth transaction data including restriction information indicating that use of the item of user information provided is restricted; and
    storing the fourth transaction data received, in the distributed ledger.

6. The control method according to claim 1, further comprising:
    receiving fifth transaction data including an identifier and deletion information, the identifier indicating user information managed and deleted in the information management system, the deletion information indicating that the user information is deleted; and
    storing the fifth transaction data received, in the distributed ledger.

7. The control method according to claim 1, further comprising:
    obtaining, when the first transaction data is received, sixth transaction data including provision information for granting a token to the first user; and
    storing the sixth transaction data obtained, in the distributed ledger.

8. The control method according to claim 1,
    wherein the permission or non-permission information includes information indicating: a period during which the provision of the user information is permitted; a user for which the provision of the user information is permitted; or whether re-provision of the user information is permitted.

9. The control method according to claim 3,
wherein the one or more items of user information are each linked with type information indicating a type of the item of user information, and
the permission or non-permission information includes type information of an item of user information permitted to be provided.

10. A system including a server and a management server comprising:
a hardware processor that
receives, from a first device used by a first user, (i) user information including private data or personal data of the first user and (ii) permission or non-permission information indicating whether provision of the user information to a second user is permitted;
records the user information and the permission or non-permission information to a memory;
generates first transaction data that includes (i) identification information being associated with the user information and relates to the first user and indicating an address of the user information registered in the management server and (ii) the permission or non-permission information;
receives, from the management server, the first transaction data that includes the identification information that indicates the address of the user information registered in the management server and the permission or non-permission information,
verifies whether the permission or non-permission information included in the first transaction data is consistent with permission or non-permission information set by the first user; and
stores, when the verifying of consistency is successful, the first transaction data that includes the identification information that indicates the address of the user information registered in the management server and that is received, in a distributed ledger.

11. A non-transitory computer-readable recording medium having a program for causing a computer to execute a control method in an information management system including a server and a management server, the control method comprising:
receiving, from a first device used by a first user, (i) user information including private data or personal data of the first user and (ii) permission or non-permission information indicating whether provision of the user information to a second user is permitted;
recording the user information and the permission or non-permission information to a memory;
generating first transaction data that includes (i) identification information being associated with the user information and relates to the first user and indicating an address of the user information registered in the management server and (ii) the permission or non-permission information;
receiving, from the management server, the first transaction data that includes the identification information that indicates the address of the user information registered in the management server and the permission or non-permission information;
verifying whether the permission or non-permission information included in the first transaction data is consistent with permission or non-permission information set by the first user; and
storing, when the verifying of consistency is successful, the first transaction data that includes the identification information that indicates the address of the user information registered in the management server and that is received in a distributed ledger.

12. The control method according to claim 1, further comprising:
inquiring, when the first transaction data is received from a management server, the first device of the first user to confirm whether the permission or non-permission information is correct;
obtaining a result of the confirming by the first user from the first device of the first user; and
verifying, based on the result of the confirming, whether the permission or non-permission information included in the first transaction data is consistent with the permission or non-permission information set by the first user.

* * * * *